(12) United States Patent
Han et al.

(10) Patent No.: US 10,788,565 B2
(45) Date of Patent: Sep. 29, 2020

(54) REFERENCE SIGNAL TIME DIFFERENCE (RSTD) MEASUREMENTS FOR OBSERVED TIME DIFFERENCE OF ARRIVAL (OTDOA) POSITIONING

(71) Applicant: Apple Inc., Cupertino, CA (US)

(72) Inventors: Seunghee Han, San Jose, CA (US); Alexey Khoryaev, Nizhny Novgorod (RU)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/347,800

(22) PCT Filed: Oct. 24, 2017

(86) PCT No.: PCT/US2017/058080
§ 371 (c)(1),
(2) Date: May 6, 2019

(87) PCT Pub. No.: WO2018/085078
PCT Pub. Date: May 11, 2018

(65) Prior Publication Data
US 2019/0257916 A1    Aug. 22, 2019

Related U.S. Application Data

(60) Provisional application No. 62/418,104, filed on Nov. 4, 2016.

(51) Int. Cl.
*G01S 5/10* (2006.01)
*G01S 5/02* (2010.01)
(Continued)

(52) U.S. Cl.
CPC .............. *G01S 5/10* (2013.01); *G01S 5/0205* (2013.01); *H04W 64/00* (2013.01); *H04W 64/003* (2013.01); *H04W 88/02* (2013.01)

(58) Field of Classification Search
None
See application file for complete search history.

(56) References Cited

U.S. PATENT DOCUMENTS

2012/0027110 A1* 2/2012 Han ..................... H04J 11/0079
375/260
2013/0336173 A1* 12/2013 Mandil ............. H04W 36/0072
370/280
(Continued)

FOREIGN PATENT DOCUMENTS

WO    2015105363 A1    7/2015
WO    2016032219 A1    3/2016
(Continued)

OTHER PUBLICATIONS

3GPP TR 37.857; Study on indoor positioning enhancements for UTRA and LTE; (Release 13); (Dec. 2015); Valbonne—France.
(Continued)

*Primary Examiner* — Ernest G Tacsik

(57) ABSTRACT

Technology for a UE configured to perform RSTD measurements for OTDOA positioning is disclosed. The UE can decode a MBSFN subframe configuration information for one or more cells in a plurality of cells. The UE can decode PRS configuration information for one or more cells in the plurality of cells. The UE can determine, for the one or more cells in the plurality of cells, an existence of a CRS for selected subframes of a plurality of subframes based on the MBSFN subframe configuration information. The UE can determine for the one or more cells in the plurality of cells, an existence of a PRS for selected subframes of the plurality of subframes based on the PRS configuration information. The UE can measure the RSTD for the one or more cells in the plurality of cells using the CRS and the PRS.

19 Claims, 10 Drawing Sheets

(51) Int. Cl.
*H04W 64/00* (2009.01)
*H04W 88/02* (2009.01)

(56) References Cited

U.S. PATENT DOCUMENTS

| 2017/0214508 | A1 | 7/2017 | Lee et al. | |
| 2018/0070209 | A1* | 3/2018 | Jain | H04W 4/025 |
| 2018/0359104 | A1* | 12/2018 | Byun | H04W 4/06 |

FOREIGN PATENT DOCUMENTS

| WO | 2016122812 A1 | 8/2016 |
| WO | 20166155774 A1 | 10/2016 |

OTHER PUBLICATIONS

3GPP TSG RADN WG1 Mtg #82bis; R1-155406; LG Electronics; Title: Discussion on OTDOA enhancements for indoor positioning; Malmo China; Oct. 5-9, 2015.

* cited by examiner

REFERENCE SIGNAL TIME DIFFERENCE (RSTD) MEASUREMENTS FOR OBSERVED TIME DIFFERENCE OF ARRIVAL (OTDOA) POSITIONING

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
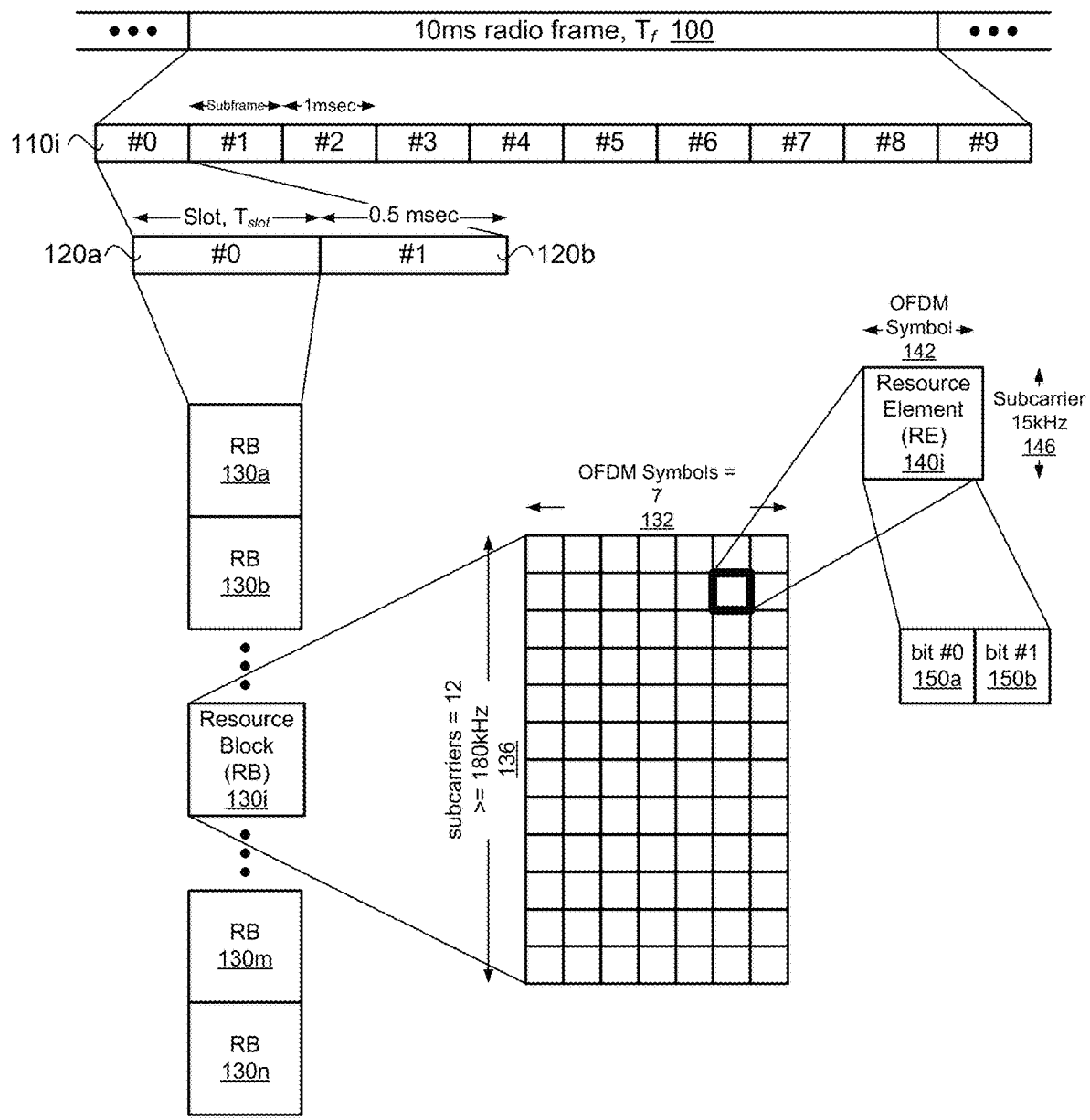
FIG. 1 illustrates a block diagram of uplink radio frame resources (e.g., a resource grid) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX WiMAX® (Worldwide interoperability for Microwave Access), and the IEEE 802.11 standard, which is commonly known to industry groups as WiFi Wi-Fi®.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). In 3GPP fifth generation (5G) LTE communication systems, the node is commonly referred to as a new radio (NR) or next generation Node B (gNodeB or gNB). The downlink (DL) transmission can be a communication from the node (e.g., eNodeB or gNodeB) to the wireless device (e.g., UE), and the uplink (UL) transmission can be a communication from the wireless device to the node.

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

The present technology describes cell specific reference signals (CRS) and positioning reference signals (PRS), and CRS and PRS awareness to perform RSTD measurements for Observed Time Difference of Arrival (OTDOA) positioning. RSTD is a measurement values of timing difference of a cell in reference to the reference cell. Multiple RSTD values will be used for calculating UE positioning location with further information of geographical coordinates of cells. The calculation can be done in location server.

In one example, both Cell Specific Reference Signal (CRS) and Positioning Reference Signal (PRS) can be used together to measure a Reference Signal Time Difference (RSTD). In certain communication formats, a CRS may not be communicated. For example, a CRS is typically not sent in the Multimedia Broadcast Multicast Service (MBMS) Single Frequency Network (MBSFN) region in an MBSFN subframe. Accordingly, a UE may not be able to find the CRS existence in all subframes for use in measuring the Reference Signal Time Difference (RSTD) for reference/neighbor cells. Currently the UE does receive information concerning the scheduling locations of MBSFN subframes. However, scheduling information were sent for MBSFN subframe configurations, the information could be used to determine when CRS information was not available in selected subframes, such as MBSFN subframes. Several embodiments for communicating when CRS is available in a subframe are provided in the proceeding paragraphs. This list is not intended to be exhaustive and accordingly should not be considered limiting.

FIG. 1 illustrates a block diagram example of uplink radio frame resources (e.g., a resource grid) in 3GPP LTE Release 8. In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

Figure 2:
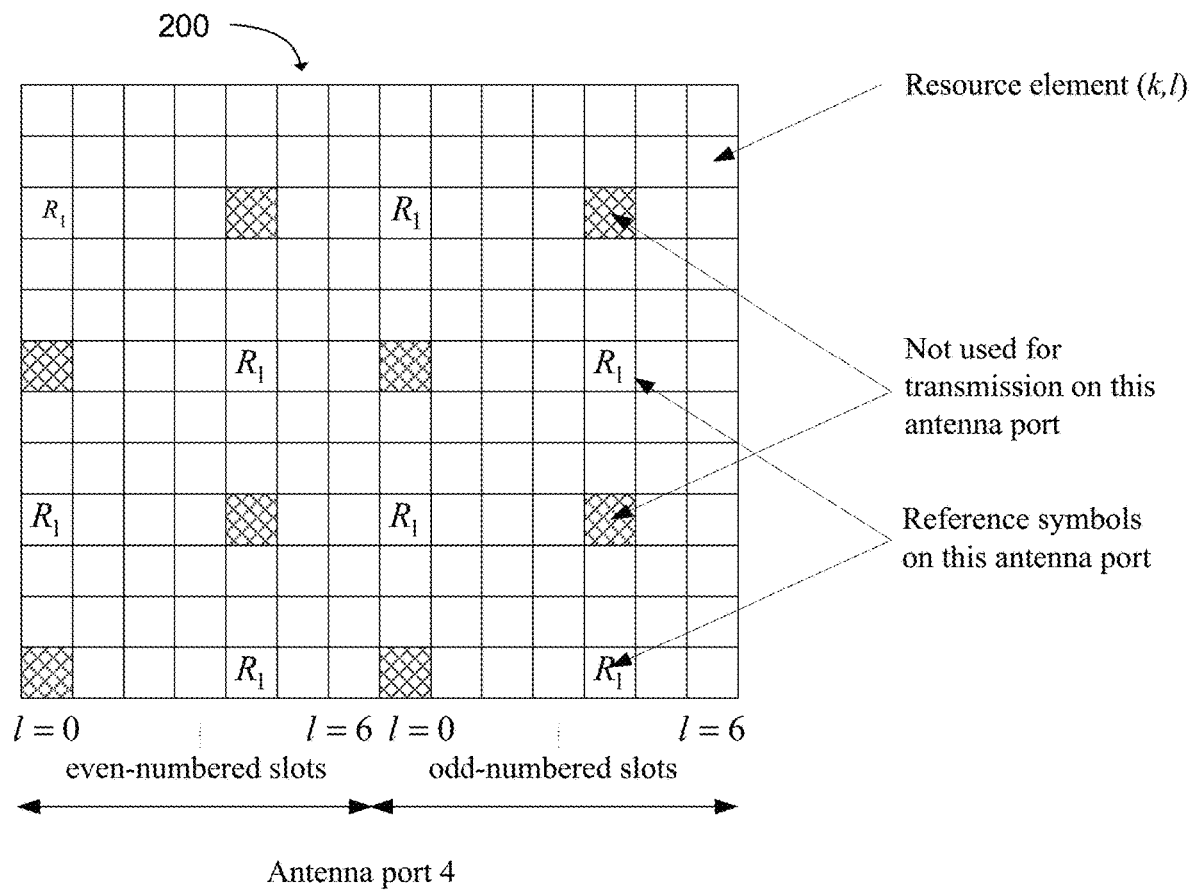
FIG. 2 illustrates a block diagram of Mapping of MBSFN reference signals (extended cyclic prefix, $\Delta f=15$ kHz) in accordance with an example.
Figure 3:
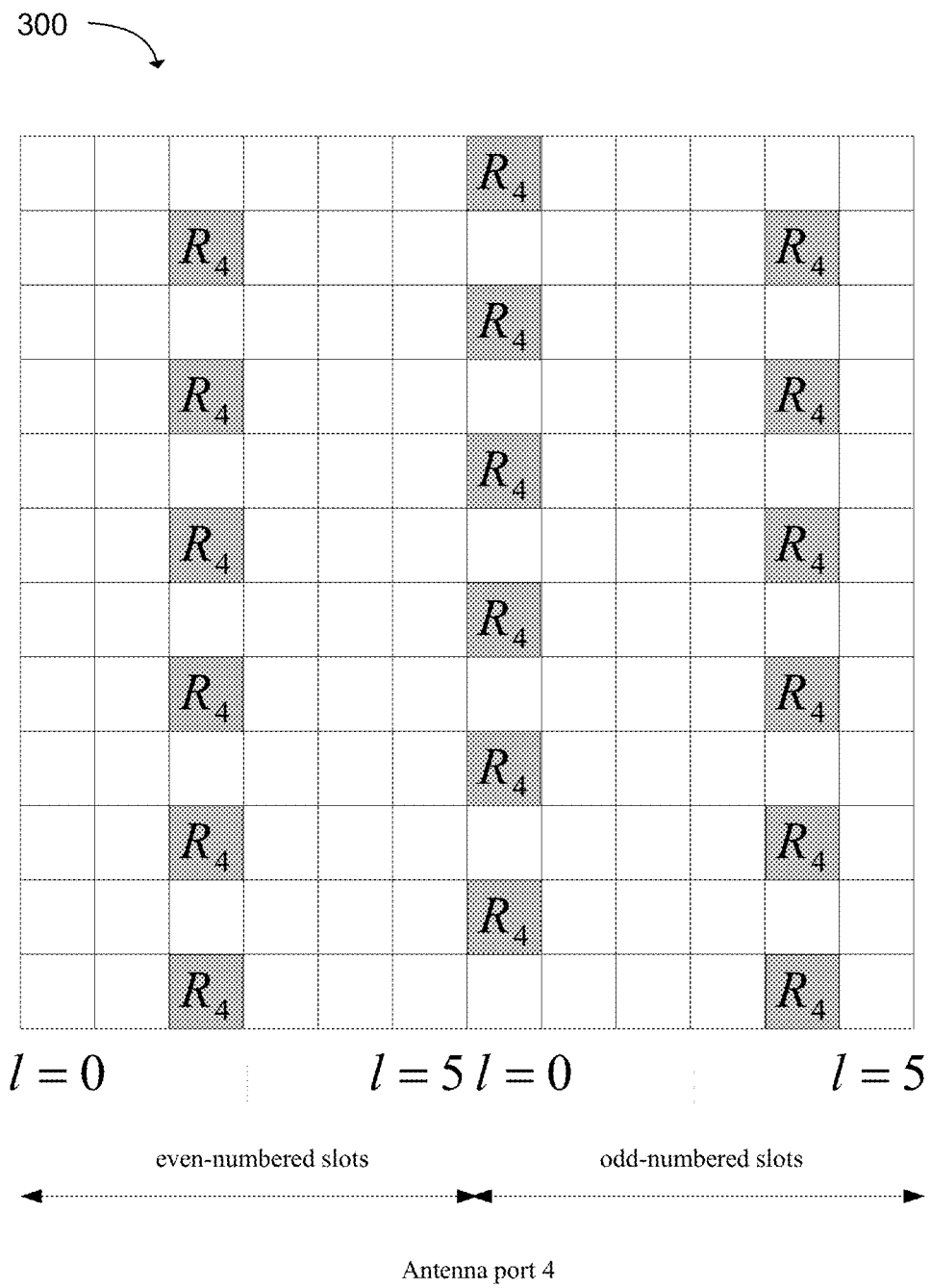
FIG. 3 illustrates a block diagram of Mapping of MBSFN reference signals (extended cyclic prefix, $\Delta f=7.5$ kHz) in accordance with an example.

FIG. 2 and FIG. 3 illustrate a block diagram 200 and a block diagram 300 of mapping of MBSFN reference signals in an MBSFN subframe. In FIG. 2, a frame is shown with MBSFN subframes with a normal cyclic prefix, resulting in seven subframes per slot, as shown in FIG. 1. The MBSFN subframes are included in subframes 0 and 4. The example of FIG. 2 shows the reference signals for antenna port 4. Selected reference elements are also illustrated that are not used for MBSFN transmission.

In FIG. 3, a frame with an extended cyclic prefix is shown resulting in 6 subframes per slot. The example of FIG. 3 shows the reference signals for antenna port 4 as well. Accordingly, the notation $R_p$ can be used to denote a resource element used for reference signal transmission on antenna port p.

In one example, configuration information for each MBSFN subframe, or a subset of the configuration information, can be signaled to the UE to configure the UE to determine which subframes include reference signals, such as the CRS.

In another example, a single configuration, for all cells, can be signaled to a UE to indicate in which subframes CRS exists for each of the cells. In this example each cell may have a different MBSFN subframe configuration.

In another example, the same MBSFN configurations for reference/neighbor cells as for serving cell can be communicated. For example, a UE may assume that the same MBSFN subframe configurations are applied for all of the reference/neighbor cells for RSTD measurement.

In one example, there can be support for the use of CRS together with PRS for Observed Time Difference Of Arrival (OTDOA) enhancement. If CRS usage together with PRS is configured, the signal cyclic prefix (CP) information for CRS can be available if PRS is present. Additionally, this CP information can be considered additional to the already existing CP signaling for PRS.

Additionally, quasi co-location between PRS and CRS can be assumed. The LS can be sent for radio access network 2 (RAN2), radio access network 3 (RAN3) and radio access network 4 (RAN4) to be captured for their operability and configuration patterns.

In one example, CRS may not be transmitted in the MBSFN region of MBSFN subframe. In current LTE Positioning Protocol LPP, MBSFN subframe information is not signaled. Thus, the UE may not be able to know the CRS existence to measure the RSTD if the UE uses CRS.

In one example, if a PRS is configured only in an MBSFN subframe in a cell, the PRS is transmitted with an extended CP. Otherwise, the same CP is used for PRS transmission as in subframe 0 (i.e. the non-MBSFN subframe). CP information for CRS and for PRS can be signaled if the UE is configured to allow the measuring of CRS and PRS.

Additionally, the UE may be configured for one or more of several cases. In case 1, there can be a normal CP for CRS, and there can be a normal CP for PRS. In case 2, there can be a normal CP for CRS, and an extended CP for PRS. In case 3, there can be an extended CP for CRS, and a normal CP for PRS. In case 4, there can be an extended CP for CRS and an extended CP for PRS.

In one example, subframes 0, 4, 5 and 9 are not configured for MBSFN subframes. Thus, among the cases previously described, for case 2, the UE can know that PRS is sent in the MBSFN subframe only and thus can figure out the CRS existence. In addition, the non-MBSFN region in an MBSFN subframe can be the first one or two OFDM symbols within the MBSFN subframe.

In one example, for case 1 and 4 that were previously described, the UE may not be able to figure out which of the subframes are going to be designated as MBSFN subframes. Rather, the UE is only able to figure out that subframe numbers 0, 4, 5, and 9 can include CRS. As previously discussed, subframes 0, 4, 5, and 9 in some cases cannot be configured for the MBSFN subframe, within a radio frame. Additionally, for subframe numbers 1, 2, 3, 6, 7, and 8, the UE may be able to use the first OFDM symbol for CRS (or first two OFDM symbols for CRS with 4-port CRS) since it is designated as a non-MBSFN region within an MBSFN subframe.

Additionally, there can be one or more processes utilized and configured to implement one or more of the examples and embodiments described above. In one process, the entire information or a subset of information corresponding to CRS existence (e.g. MBSFN subframe configuration for each reference/neighbor cell) can be signaled to the UE. There can be OTDOA-ReferenceCellInfo and OTDOA-NeighbourCellInfo in the LPP for each cell that can be used for RSTD measurement. For each information, the MBSFN subframe configuration (or corresponding information regarding CRS existence or non-existence) can be signaled. Additionally, to save some signaling overhead, some subset of an MBSFN subframe configuration information (or corresponding information of CRS existence or non-existence) can be signaled instead of the full configuration information for each MBSFN subframe.

In another process, a single configuration can be signaled to indicate which subframes CRS exists. This information can be applied for each cell. In another process, a single MBSFN subframe configuration can be configured to be applied to all reference/neighbor cells. The use of a single MBSFN subframe configuration to be applied for all reference and neighbor cells can reduce overhead given the nature of the MBSFN operation to possibly align MBSFN subframes among the different cells to leverage single frequency network (SFN) gain.

In another process, there can be the same MBSFN configurations for reference/neighbor cells as for serving cells. In this process, alternatively, the reference/neighbor cells and the serving cells can be signaled separately or simultaneously. Additionally, the UE may assume that the same MBSFN subframe configurations are applied for the reference/neighbor cells for RSTD measurement. For the serving cell, the UE is able to know the MBSFN subframe configuration via system information block 2 (SIB-2). Thus, if the network can align the MBSFN subframes across the different cells, the UE only needs to know the MBSFN subframe configuration for any of cell—which can be obtained from the SIB-2 of the serving cell. Then, the UE can assume that the same MBSFN subframe configurations for the serving cell apply for all cells (as reference cell and neighbor cells).

In certain embodiments, it may not be desirable for the network to align the MBSFN subframes across all cells. Thus, in order to give more degrees of freedom to the network, one bit signaling can be conveyed in for each cell. For example, the one bit signaling may be communicated using the OTDOA-ReferenceCellInfo and OTDOA-NeighbourCellInfo for each cell. In this example, bit 1 (or 0) can indicate MBSFN subframes are aligned for all cells so the UE can figure out CRS existence, and bit 0 (or 1) can indicate that MBSFN subframes are not aligned for the cells so UE can assume only CRS existence on subframes #0, 4, 5, 9 and the first OFDM symbol (or first two OFDM symbols) in other subframes, as previously discussed.

Figure 4:
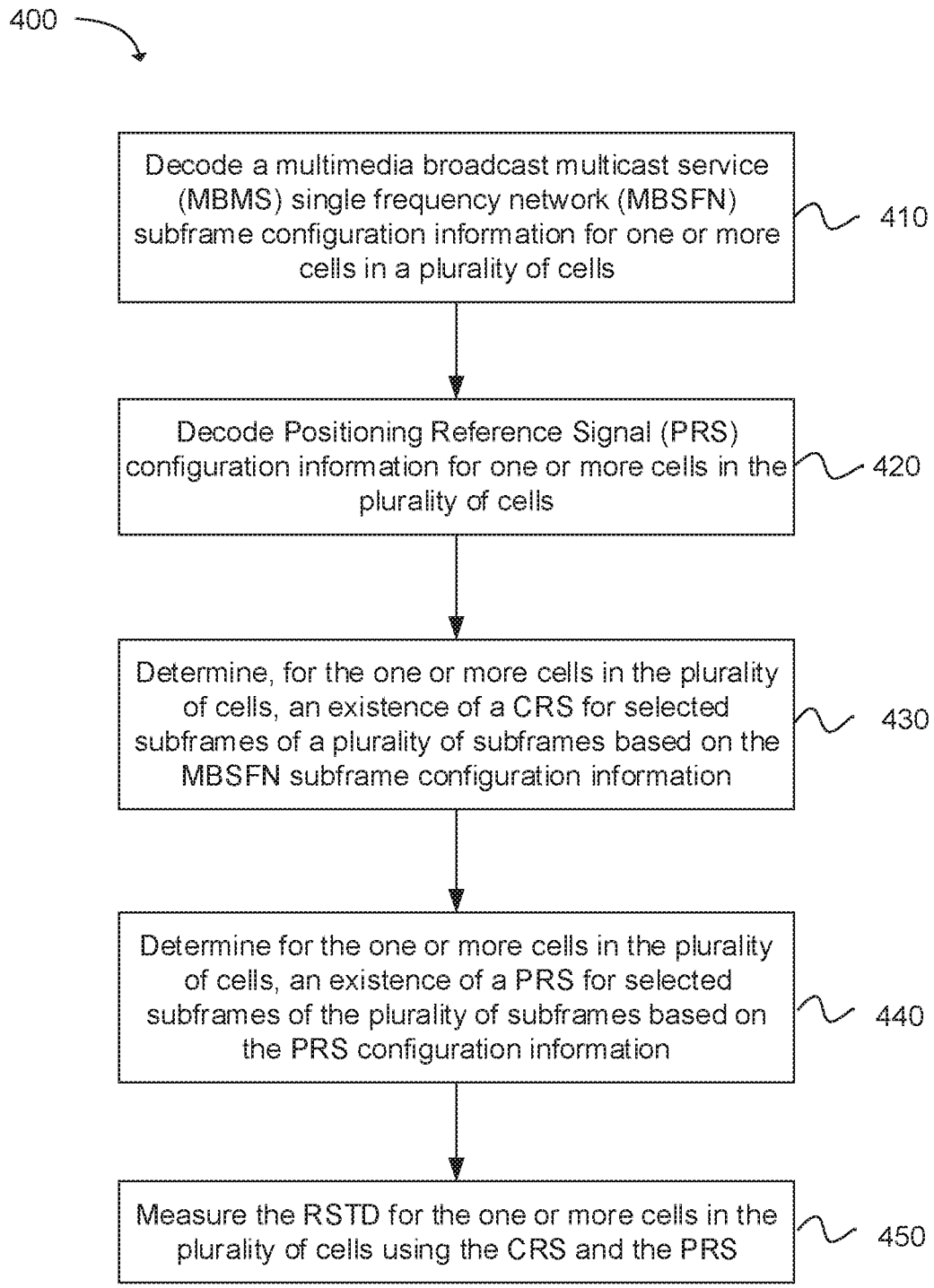
FIG. 4 depicts functionality of a user equipment (UE) configured to perform Reference Signal Time Difference (RSTD) measurements for Observed Time Difference Of Arrival (OTDOA) positioning in accordance with an example.

FIG. 4 depicts functionality 400 of an apparatus of a user equipment (UE) configured to perform Reference Signal Time Difference (RSTD) measurements for Observed Time Difference of Arrival (OTDOA) positioning. The UE can comprise of one or more processors configured to decode a multimedia broadcast multicast service (MBMS) single frequency network (MBSFN) subframe configuration information for one or more cells in a plurality of cells 410. The UE can comprise of one or more processors configured to decode Positioning Reference Signal (PRS) configuration information for one or more cells in the plurality of cells 420. The UE can comprise of one or more processors configured to determine, for the one or more cells in the plurality of cells, an existence of a CRS for selected subframes of a plurality of subframes based on the MBSFN subframe configuration information 430. The UE can comprise of one or more processors configured to determine for the one or more cells in the plurality of cells, an existence of a PRS for selected subframes of the plurality of subframes based on the PRS configuration information 440. The UE can comprise of one or more processors configured to measure the RSTD for the one or more cells in the plurality of cells using the CRS and the PRS 450.

In one embodiment, the one or more processors are further configured to decode the MBSFN subframe configuration information, wherein the MBSFN subframe configuration comprises a selected subset of full information for a MBSFN subframe.

In one embodiment, the one or more processors are further configured to decode the MBSFN subframe configuration information, wherein the MBSFN subframe configuration further comprises CRS non-existence information for one or more subframes of the plurality of subframes.

In one embodiment, the plurality of cells comprises a reference cell and one or more neighbor cells.

In one embodiment, the one or more processors are further configured to determine the existence of the CRS for the selected subframes of the plurality of subframes in each cell in the plurality of cells.

In one embodiment, the one or more processors are further configured to determine the existence of the CRS for the selected subframes of the plurality of subframes in a selected cell in the plurality of cells and apply the existence of the CRS for the remaining cells in the plurality of cells based on the MBSFN subframe configuration information.

In one embodiment, the one or more processors are further configured to decode a MBSFN subframe configuration for a cell to enable the UE to determine when the MBSFN subframe configuration for a cell to inform whether or not the MBSFN subframe configuration of the cell is different from a serving cell of the UE.

Figure 5:
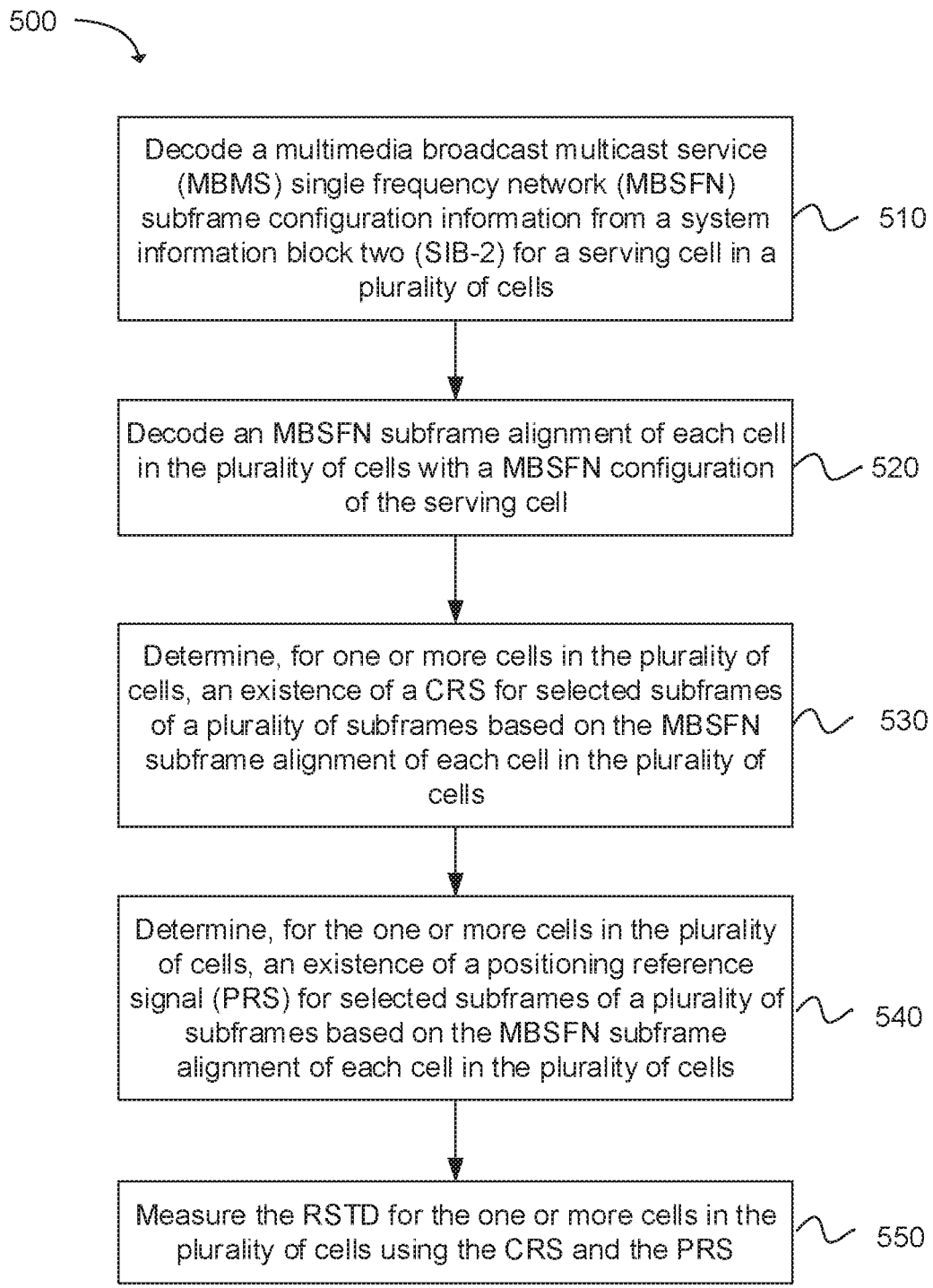
FIG. 5 depicts functionality of a user equipment (UE) configured to perform Reference Signal Time Difference (RSTD) measurements for Observed Time Difference Of Arrival (OTDOA) positioning in accordance with an example

FIG. 5 depicts functionality 500 of an apparatus of a user equipment (UE) configured to perform Reference Signal Time Difference (RSTD) measurements for Observed Time Difference Of Arrival (OTDOA) positioning. The one or more processors are configured to decode a multimedia broadcast multicast service (MBMS) single frequency network (MBSFN) subframe configuration information from a system information block two (SIB-2) for a serving cell in a plurality of cells 510. The one or more processors are configured to decode an MBSFN subframe alignment of each cell in the plurality of cells with a MBSFN configuration of the serving cell 520. The one or more processors are configured to determine, for one or more cells in the plurality of cells, an existence of a CRS for selected subframes of a plurality of subframes based on the MBSFN subframe alignment of each cell in the plurality of cells 530. The one or more processors are configured to determine, for the one or more cells in the plurality of cells, an existence of a positioning reference signal (PRS) for selected subframes of a plurality of subframes based on the MBSFN subframe alignment of each cell in the plurality of cells 540.

The one or more processors are configured to measure the RSTD for the one or more cells in the plurality of cells using the CRS and the PRS 550.

In one embodiment, the one or more processors are further configured to decode the MBSFN subframe alignment comprising signaling from the network from a network indicating selected cells from the plurality of cells that are aligned with the MBSFN subframe configuration of the serving cell.

In one embodiment, the one or more processors are further configured to decode a one bit signal in an OTDOA-reference cell information (OTDOA-ReferenceCellInfo) and an OTDOA-neighbor cell information (OTDOA-NeighborCellInfo).

In one embodiment, the one or more processors are further configured to decode a one bit signal wherein a bit one indicates MBSFN subframes for the plurality of cells are aligned with the MBSFN subframe configuration of the serving cell and a bit zero indicates that the MBSFN subframes for one or more subframes in the plurality of cells are not aligned with the MBSFN subframe configuration of the serving cell.

In one embodiment, the one or more processors are further configured to determine the existence of the CRS for selected subframes and the existence of the PRS for selected subframes for cells that are aligned with the MBSFN subframe configuration of the serving cell.

In one embodiment, the one or more processors are further configured to decode the MBSFN subframe alignment of each cell in the plurality of cells with the MBSFN subframe configuration of the serving cell to identify one or more cells in the plurality of cells that are not aligned with the MBSFN subframe configuration of the serving cell. Additionally, the one or more processors are further configured to determine, for the one or more cells in the plurality of cells that are not aligned, an existence of a CRS for subframes 0, 4, 5, 9 of a radio frame and the existence of the CRS in a first orthogonal frequency division multiplexing (OFDM) symbol in subframes 1, 2, 3, 6, 7, 8 of the radio frame.

Figure 6:
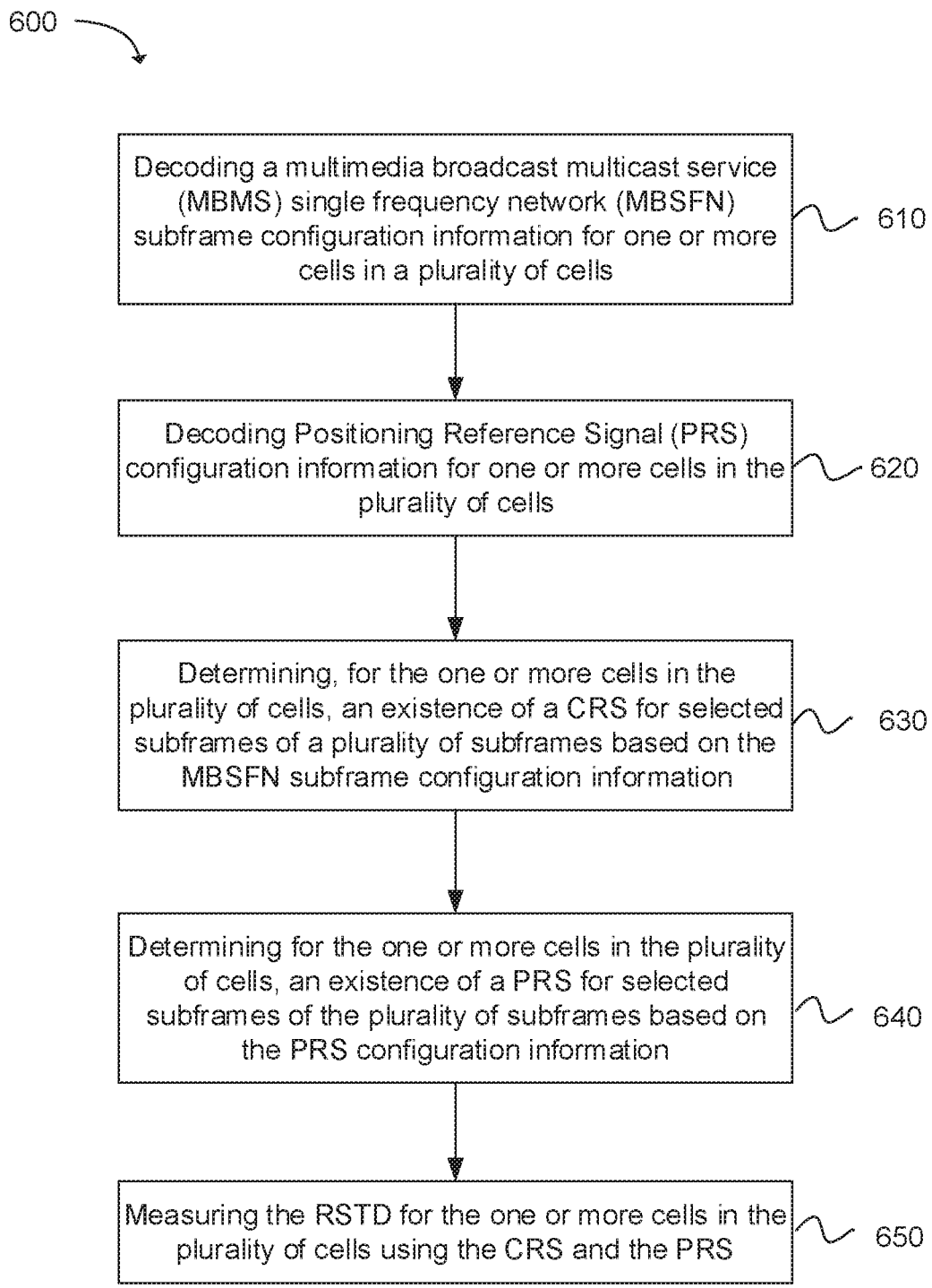
FIG. 6 depicts a flowchart of a machine readable storage medium having instructions embodied thereon for supporting an apparatus of a user equipment (UE) configured to perform Reference Signal Time Difference (RSTD) measurements for Observed Time Difference Of Arrival (OTDOA) positioning in accordance with an example.

FIG. 6 depicts a flowchart 600 of a machine readable storage medium having instructions embodied thereon for supporting an apparatus of a user equipment (UE) configured to perform Reference Signal Time Difference (RSTD) measurements for Observed Time Difference Of Arrival (OTDOA) positioning. The instructions can be executed on a machine, where the instructions are included on at least one computer readable medium or one non-transitory machine readable storage medium. The instructions when executed perform decoding a multimedia broadcast multicast service (MBMS) single frequency network (MBSFN) subframe configuration information for one or more cells in a plurality of cells 610. The instructions when executed perform decoding Positioning Reference Signal (PRS) configuration information for one or more cells in the plurality of cells. The instructions when executed perform determining, for the one or more cells in the plurality of cells, an existence of a CRS for selected subframes of a plurality of subframes based on the MBSFN subframe configuration information. The instructions when executed perform determining for the one or more cells in the plurality of cells, an existence of a PRS for selected subframes of the plurality of subframes based on the PRS configuration information. The instructions when executed perform measuring the RSTD for the one or more cells in the plurality of cells using the CRS and the PRS.

In another example, the at least one machine readable storage medium can further comprise instructions, that when executed by one or more processors at the UE perform decoding the MBSFN subframe configuration information, wherein the MBSFN subframe configuration comprises a selected subset of full information for a MBSFN subframe.

In another example, the at least one machine readable storage medium can further comprise instructions, that when executed by one or more processors at the UE perform decoding the MBSFN subframe configuration information, wherein the MBSFN subframe configuration further comprises CRS non-existence information for one or more subframes of the plurality of subframes.

In another example, the at least one machine readable storage medium can further comprise instructions, that when executed by one or more processors at the UE perform determining the existence of the CRS for the selected subframes of the plurality of subframes in each cell in the plurality of cells.

In another example, the at least one machine readable storage medium can further comprise instructions, that when executed by one or more processors at the UE perform determining the existence of the CRS for the selected subframes of the plurality of subframes in a selected cell in the plurality of cells and apply the existence of the CRS for the remaining cells in the plurality of cells based on the MBSFN subframe configuration information.

In another example, the at least one machine readable storage medium can further comprise instructions, wherein the plurality of cells comprises a reference cell and one or more neighbor cells.

In another example, the at least one machine readable storage medium can further comprise instructions, that when executed by one or more processors at the UE perform decoding a MBSFN subframe configuration for a cell to enable the UE to determine when the MBSFN subframe configuration for a cell to inform whether or not the MBSFN subframe configuration of the cell is different from a serving cell of the UE.

Figure 7:
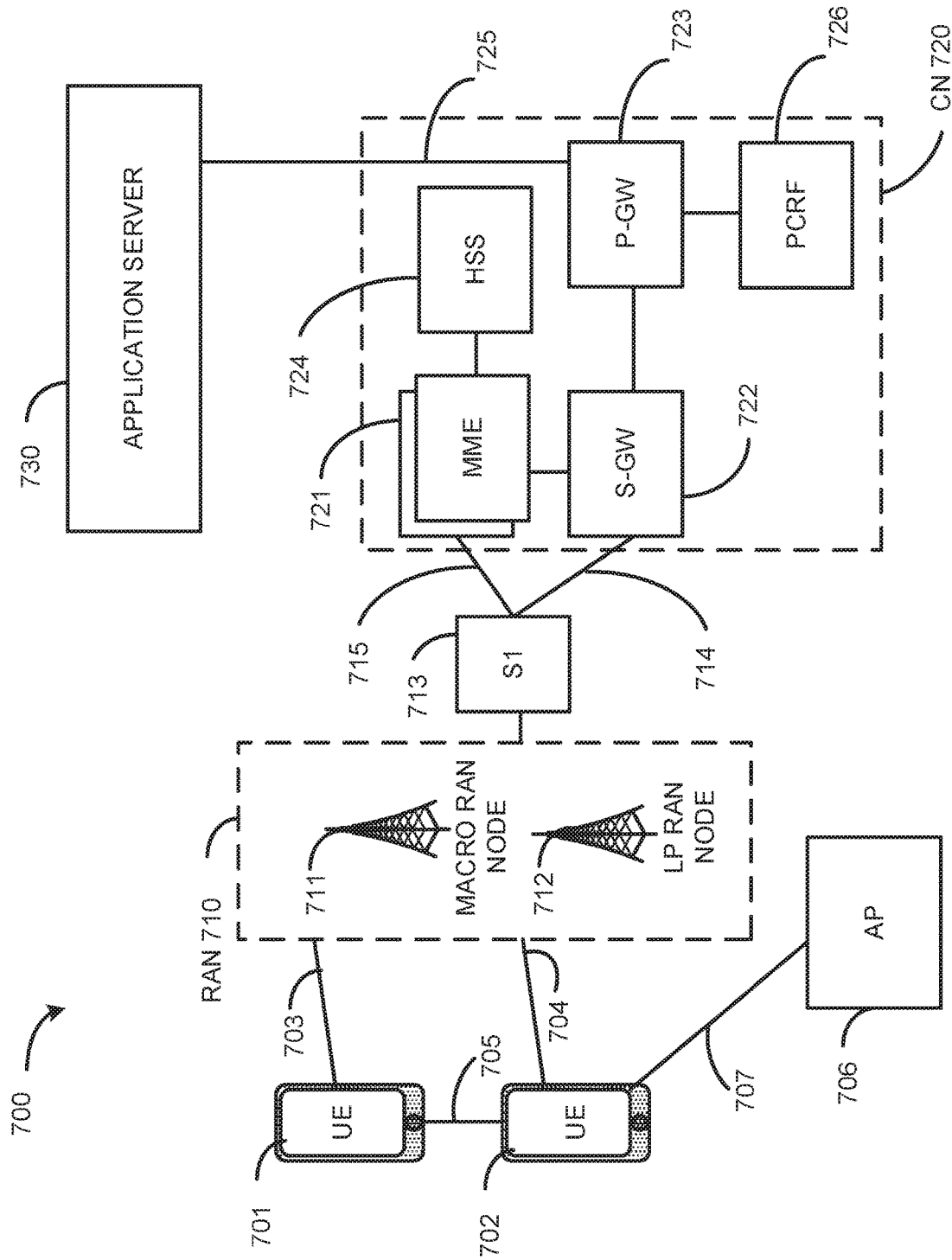
FIG. 7 illustrates an architecture of a network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and eternal networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
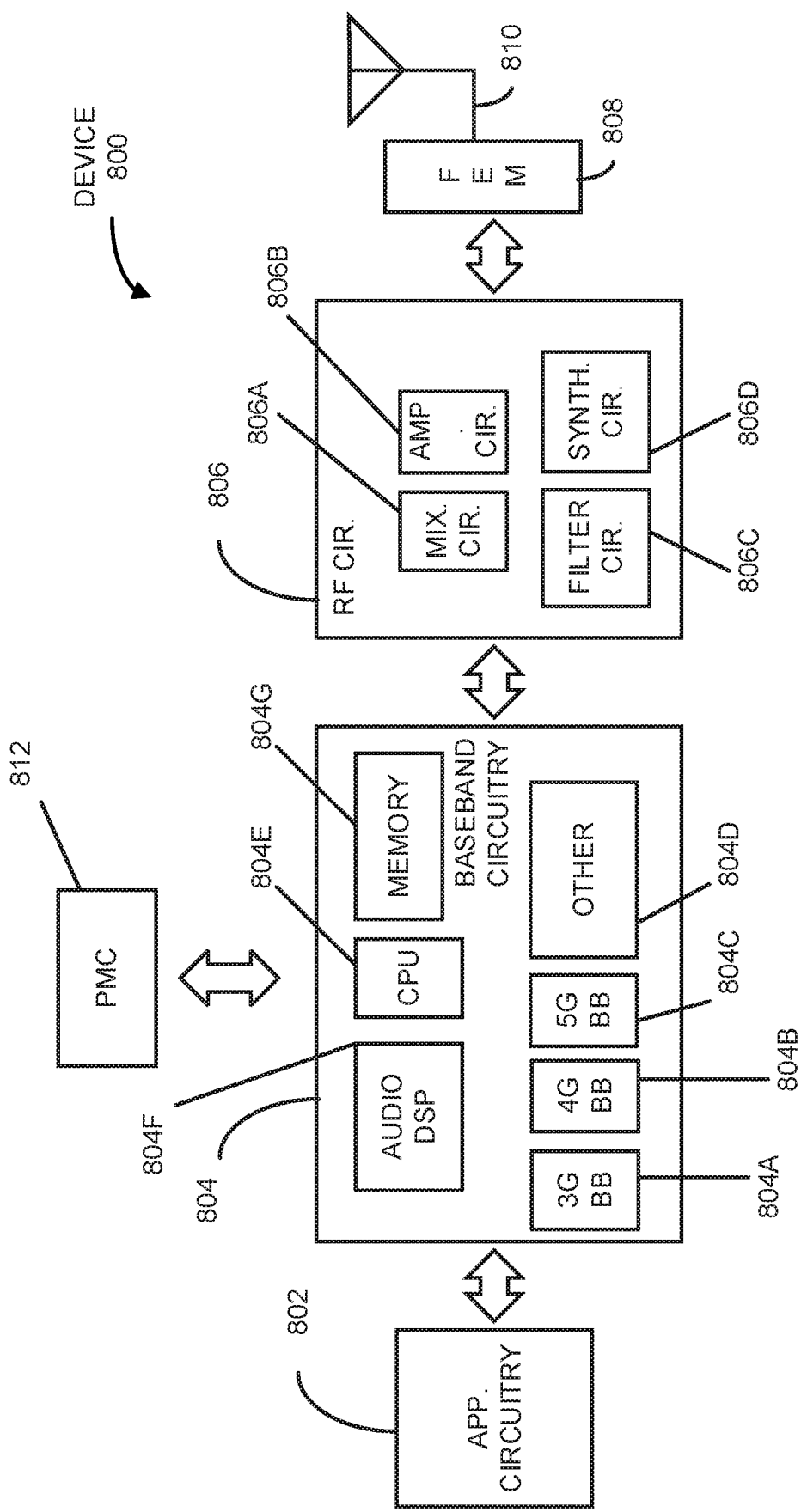
FIG. 8 illustrates a diagram of a wireless device (e.g., UE) and a base station (e.g., eNodeB) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
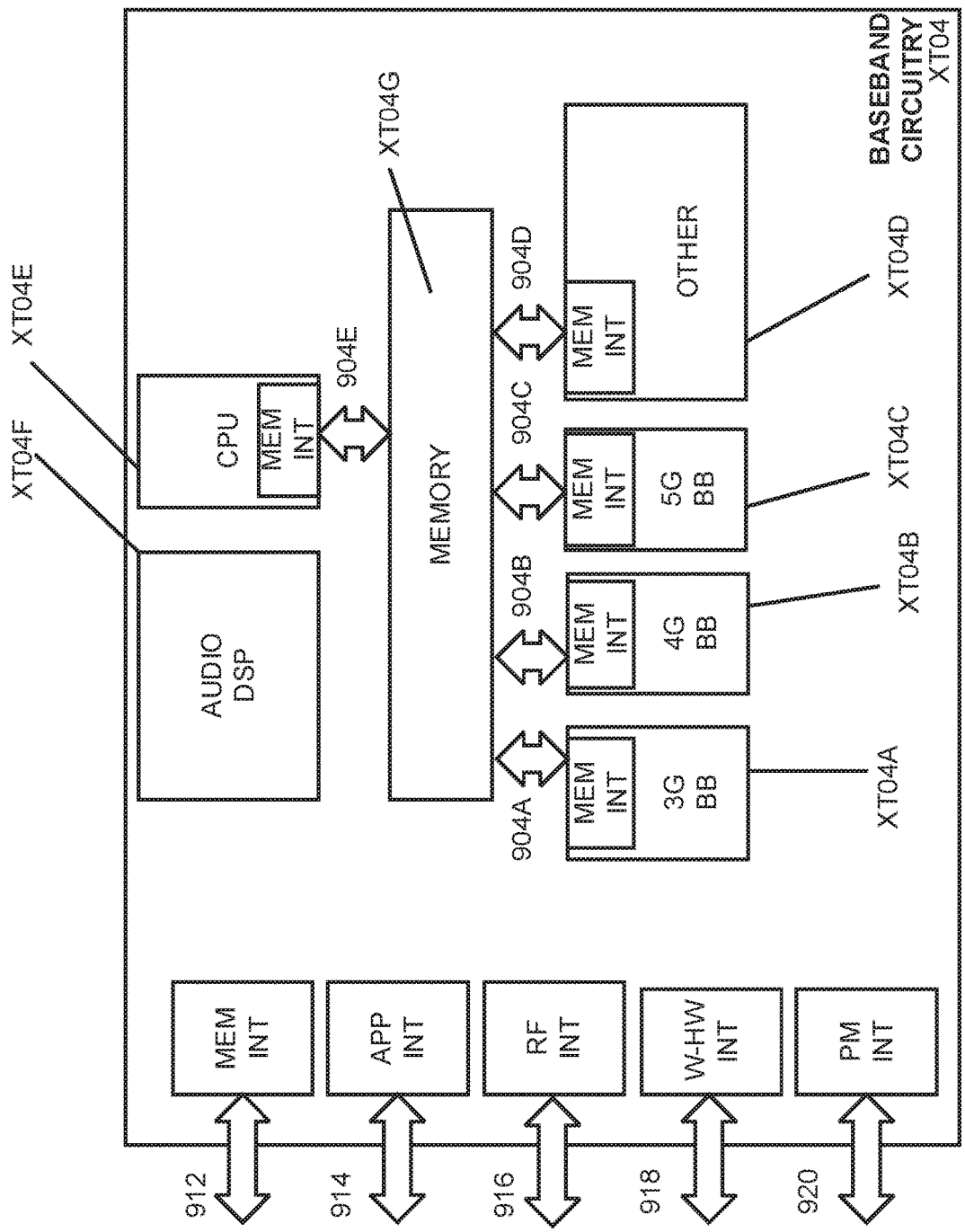
FIG. 9 illustrates example interfaces of baseband circuitry in accordance with an example.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory eternal to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
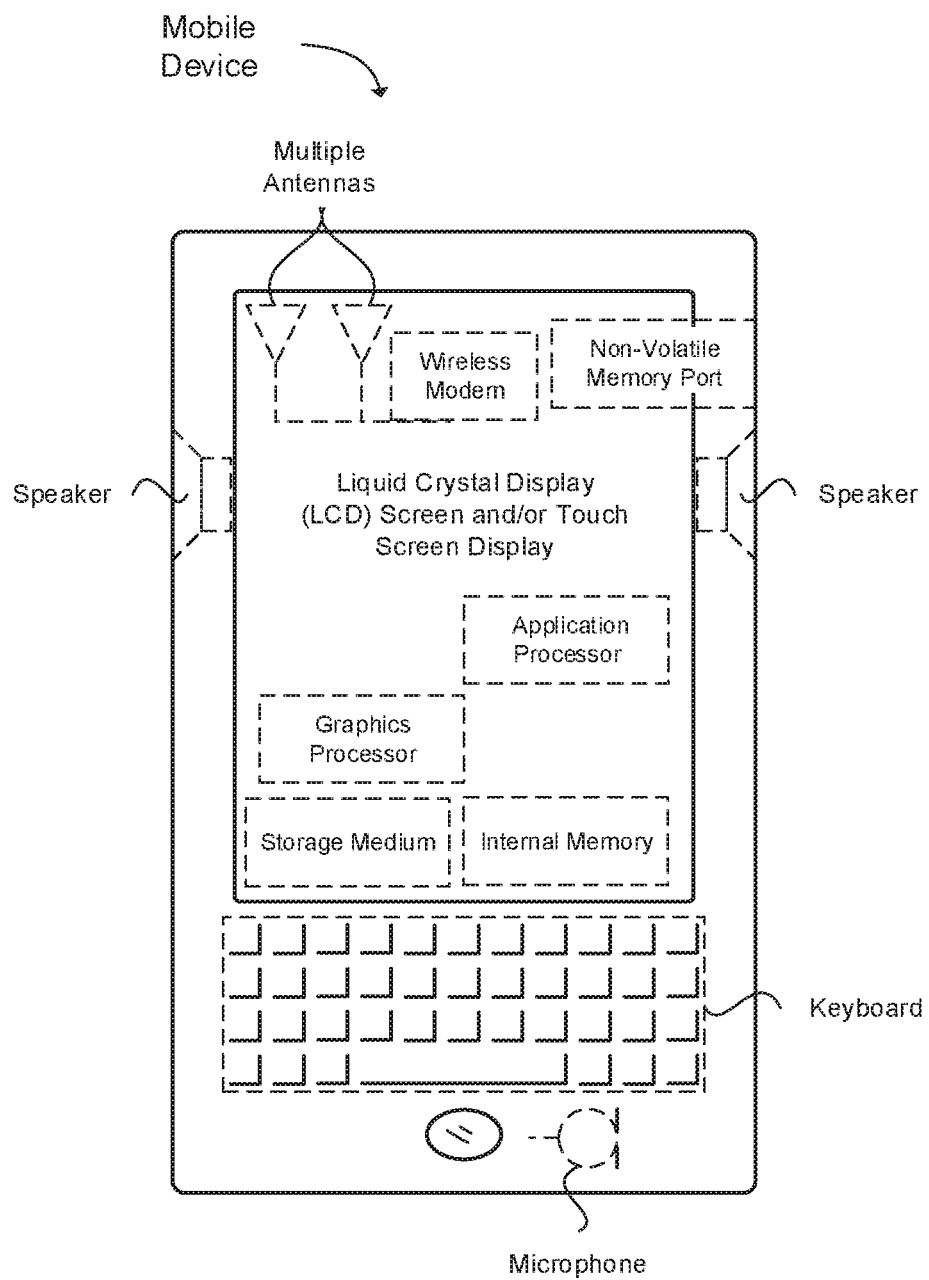
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX®, High Speed Packet Access (HSPA), Bluetooth, and Wi-Fi®. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a user equipment (UE) configured to perform Reference Signal Time Difference (RSTD) measurements for Observed Time Difference Of Arrival (OTDOA) positioning, the apparatus comprising: one or more processors configured to: decode a multimedia broadcast multicast service (MBMS) single frequency network (MBSFN) subframe configuration information for one or more cells in a plurality of cells; decode Positioning Reference Signal (PRS) configuration information for one or more cells in the plurality of cells; determine, for the one or more cells in the plurality of cells, an existence of a CRS for selected subframes of a plurality of subframes based on the MBSFN subframe configuration information; determine for the one or more cells in the plurality of cells, an existence of a PRS for selected subframes of the plurality of subframes based on the PRS configuration information; measure the RSTD for the one or more cells in the plurality of cells using the CRS and the PRS; and a memory interface configured to send to a memory the RSTD.

Example 2 includes the apparatus of example 1, wherein the one or more processors are further configured to decode the MBSFN subframe configuration information, wherein the MBSFN subframe configuration comprises a selected subset of full information for a MBSFN subframe.

Example 3 includes the apparatus of example 1 or 2, wherein the one or more processors are further configured to decode the MBSFN subframe configuration information, wherein the MBSFN subframe configuration further comprises CRS non-existence information for one or more subframes of the plurality of subframes.

Example 4 includes the apparatus of example 1 or 2, wherein the plurality of cells comprises a reference cell and one or more neighbor cells.

Example 5 includes the apparatus of example 1, wherein the one or more processors are further configured to determine the existence of the CRS for the selected subframes of the plurality of subframes in each cell in the plurality of cells.

Example 6 includes the apparatus of example 1, wherein the one or more processors are further configured to determine the existence of the CRS for the selected subframes of the plurality of subframes in a selected cell in the plurality of cells and apply the existence of the CRS for the remaining cells in the plurality of cells based on the MBSFN subframe configuration information.

Example 7 includes the apparatus of example 1, wherein the one or more processors are further configured to decode a MBSFN subframe configuration for a cell to enable the UE to determine when the MBSFN subframe configuration for a cell to inform whether or not the MBSFN subframe configuration of the cell is different from a serving cell of the UE.

Example 8 includes an apparatus of a user equipment (UE) configured to perform Reference Signal Time Difference (RSTD) measurements for Observed Time Difference Of Arrival (OTDOA) positioning, the apparatus comprising: one or more processors configured to: decode a multimedia broadcast multicast service (MBMS) single frequency network (MBSFN) subframe configuration information from a system information block two (SIB-2) for a serving cell in a plurality of cells; decode an MBSFN subframe alignment of each cell in the plurality of cells with a MBSFN configuration of the serving cell; determine, for one or more cells in the plurality of cells, an existence of a CRS for selected subframes of a plurality of subframes based on the MBSFN subframe alignment of each cell in the plurality of cells; determine, for the one or more cells in the plurality of cells, an existence of a positioning reference signal (PRS) for selected subframes of a plurality of subframes based on the MBSFN subframe alignment of each cell in the plurality of cells; and measure the RSTD for the one or more cells in the plurality of cells using the CRS and the PRS; and a memory interface configured to send to a memory the RSTD.

Example 9 includes the apparatus of example 8, wherein the one or more processors are further configured to decode the MBSFN subframe alignment comprising signaling from the network from a network indicating selected cells from the plurality of cells that are aligned with the MBSFN subframe configuration of the serving cell.

Example 10 includes the apparatus of example 8 or 9, wherein the one or more processors are further configured to decode a one bit signal in an OTDOA-reference cell information (OTDOA-ReferenceCellInfo) and an OTDOA-neighbor cell information (OTDOA-NeighborCellInfo).

Example 11 includes the apparatus of example 8 or 9, wherein the one or more processors are further configured to decode a one bit signal wherein a bit one indicates MBSFN subframes for the plurality of cells are aligned with the MBSFN subframe configuration of the serving cell and a bit zero indicates that the MBSFN subframes for one or more subframes in the plurality of cells are not aligned with the MBSFN subframe configuration of the serving cell.

Example 12 includes the apparatus of example 8, wherein the one or more processors are further configured to determine the existence of the CRS for selected subframes and the existence of the PRS for selected subframes for cells that are aligned with the MBSFN subframe configuration of the serving cell.

Example 13 includes the apparatus of example 8 or 9, wherein the one or more processors are further configured to: decode the MBSFN subframe alignment of each cell in the plurality of cells with the MBSFN subframe configuration of the serving cell to identify one or more cells in the plurality of cells that are not aligned with the MBSFN subframe configuration of the serving cell; and determine, for the one or more cells in the plurality of cells that are not aligned, an existence of a CRS for subframes 0, 4, 5, 9 of a radio frame and the existence of the CRS in a first orthogonal frequency division multiplexing (OFDM) symbol in subframes 1, 2, 3, 6, 7, 8 of the radio frame.

Example 14 includes at least one machine readable storage medium having instructions embodied there on for supporting an apparatus of a user equipment (UE) configured to perform Reference Signal Time Difference (RSTD) measurements for Observed Time Difference Of Arrival (OTDOA) positioning, the instructions when executed by one or more processors at the UE perform the following: decoding a multimedia broadcast multicast service (MBMS) single frequency network (MBSFN) subframe configuration information for one or more cells in a plurality of cells; decoding Positioning Reference Signal (PRS) configuration information for one or more cells in the plurality of cells; determining, for the one or more cells in the plurality of cells, an existence of a CRS for selected subframes of a plurality of subframes based on the MBSFN subframe configuration information; determining for the one or more cells in the plurality of cells, an existence of a PRS for selected subframes of the plurality of subframes based on the PRS configuration information; and measuring the RSTD for the one or more cells in the plurality of cells using the CRS and the PRS.

Example 15 includes the at least one machine readable storage medium of example 14, further comprising instructions when executed by the one or more processors perform the following: decoding the MBSFN subframe configuration information, wherein the MBSFN subframe configuration comprises a selected subset of full information for a MBSFN subframe.

Example 16 includes the at least one machine readable storage medium of example 14 or 15, further comprising instructions when executed by the one or more processors perform the following: decoding the MBSFN subframe configuration information, wherein the MBSFN subframe configuration further comprises CRS non-existence information for one or more subframes of the plurality of subframes.

Example 17 includes the at least one machine readable storage medium of example 14, further comprising instructions when executed by the one or more processors perform the following: determining the existence of the CRS for the selected subframes of the plurality of subframes in each cell in the plurality of cells.

Example 18 includes the at least one machine readable storage medium of example 14, further comprising instructions when executed by the one or more processors perform the following: determining the existence of the CRS for the selected subframes of the plurality of subframes in a selected cell in the plurality of cells and apply the existence of the CRS for the remaining cells in the plurality of cells based on the MBSFN subframe configuration information.

Example 19 includes the at least one machine readable storage medium of example 14, wherein the plurality of cells comprises a reference cell and one or more neighbor cells.

Example 20 includes the at least one machine readable storage medium of example 14, further comprising instructions when executed by the one or more processors perform the following: decoding a MBSFN subframe configuration for a cell to enable the UE to determine when the MBSFN subframe configuration for a cell to inform whether or not the MBSFN subframe configuration of the cell is different from a serving cell of the UE.

Example 21 includes an apparatus of a user equipment (UE) configured to perform Reference Signal Time Difference (RSTD) measurements for Observed Time Difference Of Arrival (OTDOA) positioning, the apparatus comprising: one or more processors configured to: decode a multimedia broadcast multicast service (MBMS) single frequency network (MBSFN) subframe configuration information for one or more cells in a plurality of cells; decode Positioning Reference Signal (PRS) configuration information for one or more cells in the plurality of cells; determine, for the one or more cells in the plurality of cells, an existence of a CRS for selected subframes of a plurality of subframes based on the MBSFN subframe configuration information; determine for the one or more cells in the plurality of cells, an existence of a PRS for selected subframes of the plurality of subframes based on the PRS configuration information; measure the RSTD for the one or more cells in the plurality of cells using the CRS and the PRS; and a memory interface configured to send to a memory the RSTD.

Example 22 includes the apparatus of example 21, wherein the one or more processors are further configured to decode the MBSFN subframe configuration information, wherein the MBSFN subframe configuration comprises a selected subset of full information for a MBSFN subframe.

Example 23 includes the apparatus of example 21, wherein the one or more processors are further configured to decode the MBSFN subframe configuration information, wherein the MBSFN subframe configuration further comprises CRS non-existence information for one or more subframes of the plurality of subframes.

Example 24 includes the apparatus of example 21, wherein the plurality of cells comprises a reference cell and one or more neighbor cells.

Example 25 includes the apparatus of example 21, wherein the one or more processors are further configured to determine the existence of the CRS for the selected subframes of the plurality of subframes in each cell in the plurality of cells.

Example 26 includes the apparatus of example 21, wherein the one or more processors are further configured to determine the existence of the CRS for the selected subframes of the plurality of subframes in a selected cell in the plurality of cells and apply the existence of the CRS for the remaining cells in the plurality of cells based on the MBSFN subframe configuration information.

Example 27 includes the apparatus of example 21, wherein the one or more processors are further configured to decode a MBSFN subframe configuration for a cell to enable the UE to determine when the MBSFN subframe configuration for a cell to inform whether or not the MBSFN subframe configuration of the cell is different from a serving cell of the UE.

Example 28 includes an apparatus of a user equipment (UE) configured to perform Reference Signal Time Difference (RSTD) measurements for Observed Time Difference Of Arrival (OTDOA) positioning, the apparatus comprising: one or more processors configured to: decode a multimedia broadcast multicast service (MBMS) single frequency network (MBSFN) subframe configuration information from a system information block two (SIB-2) for a serving cell in a plurality of cells; decode an MBSFN subframe alignment of each cell in the plurality of cells with a MBSFN configuration of the serving cell; determine, for one or more cells in the plurality of cells, an existence of a CRS for selected subframes of a plurality of subframes based on the MBSFN subframe alignment of each cell in the plurality of cells; determine, for the one or more cells in the plurality of cells, an existence of a positioning reference signal (PRS) for selected subframes of a plurality of subframes based on the MBSFN subframe alignment of each cell in the plurality of cells; and measure the RSTD for the one or more cells in the plurality of cells using the CRS and the PRS; and a memory interface configured to send to a memory the RSTD.

Example 29 includes the apparatus of example 28, wherein the one or more processors are further configured to decode the MBSFN subframe alignment comprising signaling from the network from a network indicating selected cells from the plurality of cells that are aligned with the MBSFN subframe configuration of the serving cell.

Example 30 includes the apparatus of example 28, wherein the one or more processors are further configured to decode a one bit signal in an OTDOA-reference cell information (OTDOA-ReferenceCellInfo) and an OTDOA-neighbor cell information (OTDOA-NeighborCellInfo).

Example 31 includes the apparatus of example 28, wherein the one or more processors are further configured to decode a one bit signal wherein a bit one indicates MBSFN subframes for the plurality of cells are aligned with the MBSFN subframe configuration of the serving cell and a bit zero indicates that the MBSFN subframes for one or more subframes in the plurality of cells are not aligned with the MBSFN subframe configuration of the serving cell.

Example 32 includes the apparatus of example 28, wherein the one or more processors are further configured to determine the existence of the CRS for selected subframes and the existence of the PRS for selected subframes for cells that are aligned with the MBSFN subframe configuration of the serving cell.

Example 33 includes the apparatus of example 28, wherein the one or more processors are further configured to: decode the MBSFN subframe alignment of each cell in the plurality of cells with the MBSFN subframe configuration of the serving cell to identify one or more cells in the plurality of cells that are not aligned with the MBSFN subframe configuration of the serving cell; and determine, for the one or more cells in the plurality of cells that are not aligned, an existence of a CRS for subframes 0, 4, 5, 9 of a radio frame and the existence of the CRS in a first orthogonal frequency division multiplexing (OFDM) symbol in subframes 1, 2, 3, 6, 7, 8 of the radio frame.

Example 34 includes at least one machine readable storage medium having instructions embodied there on for supporting an apparatus of a user equipment (UE) configured to perform Reference Signal Time Difference (RSTD) measurements for Observed Time Difference Of Arrival (OTDOA) positioning, the instructions when executed by one or more processors at the UE perform the following: decoding a multimedia broadcast multicast service (MBMS) single frequency network (MBSFN) subframe configuration information for one or more cells in a plurality of cells; decoding Positioning Reference Signal (PRS) configuration information for one or more cells in the plurality of cells; determining, for the one or more cells in the plurality of cells, an existence of a CRS for selected subframes of a plurality of subframes based on the MBSFN subframe configuration information; determining for the one or more cells in the plurality of cells, an existence of a PRS for selected subframes of the plurality of subframes based on the PRS configuration information; and measuring the RSTD for the one or more cells in the plurality of cells using the CRS and the PRS.

Example 35 includes the at least one machine readable storage medium of example 34, further comprising instructions when executed by the one or more processors perform the following: decoding the MBSFN subframe configuration information, wherein the MBSFN subframe configuration comprises a selected subset of full information for a MBSFN subframe.

Example 36 includes the at least one machine readable storage medium of example 34, further comprising instructions when executed by the one or more processors perform the following: decoding the MBSFN subframe configuration information, wherein the MBSFN subframe configuration further comprises CRS non-existence information for one or more subframes of the plurality of subframes.

Example 37 includes the at least one machine readable storage medium of example 34, further comprising instructions when executed by the one or more processors perform the following: determining the existence of the CRS for the selected subframes of the plurality of subframes in each cell in the plurality of cells.

Example 38 includes the at least one machine readable storage medium of example 34, further comprising instructions when executed by the one or more processors perform the following: determining the existence of the CRS for the selected subframes of the plurality of subframes in a selected cell in the plurality of cells and apply the existence of the CRS for the remaining cells in the plurality of cells based on the MBSFN subframe configuration information.

Example 39 includes the at least one machine readable storage medium of example 34, wherein the plurality of cells comprises a reference cell and one or more neighbor cells.

Example 40 includes the at least one machine readable storage medium of example 34, further comprising instructions when executed by the one or more processors perform the following: decoding a MBSFN subframe configuration for a cell to enable the UE to determine when the MBSFN subframe configuration for a cell to inform whether or not the MBSFN subframe configuration of the cell is different from a serving cell of the UE.

Example 41 includes an apparatus of a user equipment (UE) configured to perform Reference Signal Time Difference (RSTD) measurements for Observed Time Difference Of Arrival (OTDOA) positioning, the apparatus comprising: one or more processors configured to: decode a multimedia broadcast multicast service (MBMS) single frequency network (MBSFN) subframe configuration information for one or more cells in a plurality of cells; decode Positioning Reference Signal (PRS) configuration information for one or more cells in the plurality of cells; determine, for the one or more cells in the plurality of cells, an existence of a CRS for selected subframes of a plurality of subframes based on the MBSFN subframe configuration information; determine for the one or more cells in the plurality of cells, an existence of a PRS for selected subframes of the plurality of subframes based on the PRS configuration information; measure the RSTD for the one or more cells in the plurality of cells using the CRS and the PRS; and a memory interface configured to send to a memory the RSTD.

Example 42 includes the apparatus of example 41, wherein the one or more processors are further configured to: decode the MBSFN subframe configuration information, wherein the MBSFN subframe configuration comprises a selected subset of full information for a MBSFN subframe; decode the MBSFN subframe configuration information, wherein the MBSFN subframe configuration further comprises CRS non-existence information for one or more subframes of the plurality of subframes.

Example 43 includes the apparatus of example 41 or 42, wherein the plurality of cells comprises a reference cell and one or more neighbor cells.

Example 44 includes the apparatus of example 41, wherein the one or more processors are further configured to: determine the existence of the CRS for the selected subframes of the plurality of subframes in each cell in the plurality of cells; or determine the existence of the CRS for the selected subframes of the plurality of subframes in a selected cell in the plurality of cells and apply the existence of the CRS for the remaining cells in the plurality of cells based on the MBSFN subframe configuration information.

Example 45 includes the apparatus of example 41, wherein the one or more processors are further configured to decode a MBSFN subframe configuration for a cell to enable the UE to determine when the MBSFN subframe configuration for a cell to inform whether or not the MBSFN subframe configuration of the cell is different from a serving cell of the UE.

Example 46 includes an apparatus of a user equipment (UE) configured to perform Reference Signal Time Difference (RSTD) measurements for Observed Time Difference Of Arrival (OTDOA) positioning, the apparatus comprising: one or more processors configured to: decode a multimedia broadcast multicast service (MBMS) single frequency network (MBSFN) subframe configuration information from a system information block two (SIB-2) for a serving cell in a plurality of cells; decode an MBSFN subframe alignment of each cell in the plurality of cells with a MBSFN configuration of the serving cell; determine, for one or more cells in the plurality of cells, an existence of a CRS for selected subframes of a plurality of subframes based on the MBSFN subframe alignment of each cell in the plurality of cells; determine, for one or more cells in the plurality of cells, an existence of a positioning reference signal (PRS) for selected subframes of a plurality of subframes based on the MBSFN subframe alignment of each cell in the plurality of cells; and measure the RSTD for the one or more cells in the plurality of cells using the CRS and the PRS; and a memory interface configured to send to a memory the RSTD.

Example 47 includes the apparatus of example 46, wherein the one or more processors are further configured to: decode the MBSFN subframe alignment comprising signaling from the network from a network indicating selected cells from the plurality of cells that are aligned with the MBSFN subframe configuration of the serving cell; or decode a one bit signal in an OTDOA-reference cell information (OTDOA-ReferenceCellInfo) and an OTDOA-neighbor cell information (OTDOA-NeighborCellInfo).

Example 48 includes the apparatus of example 46, wherein the one or more processors are further configured to: decode a one bit signal wherein a bit one indicates MBSFN subframes for the plurality of cells are aligned with the MBSFN subframe configuration of the serving cell and a bit zero indicates that the MBSFN subframes for one or more subframes in the plurality of cells are not aligned with the MBSFN subframe configuration of the serving cell; or determine the existence of the CRS for selected subframes and the existence of the PRS for selected subframes for cells that are aligned with the MBSFN subframe configuration of the serving cell.

Example 49 includes the apparatus of example 46 or 47, wherein the one or more processors are further configured to: decode the MBSFN subframe alignment of each cell in the plurality of cells with the MBSFN subframe configuration of the serving cell to identify one or more cells in the plurality of cells that are not aligned with the MBSFN subframe configuration of the serving cell; and determine, for the one or more cells in the plurality of cells that are not aligned, an existence of a CRS for subframes 0, 4, 5, 9 of a radio frame and the existence of the CRS in a first orthogonal frequency division multiplexing (OFDM) symbol in subframes 1, 2, 3, 6, 7, 8 of the radio frame.

Example 50 includes at least one machine readable storage medium having instructions embodied there on for supporting an apparatus of a user equipment (UE) configured to perform Reference Signal Time Difference (RSTD) measurements for Observed Time Difference Of Arrival (OTDOA) positioning, the instructions when executed by one or more processors at the UE perform the following: decoding a multimedia broadcast multicast service (MBMS) single frequency network (MBSFN) subframe configuration information for one or more cells in a plurality of cells; decoding Positioning Reference Signal (PRS) configuration information for one or more cells in the plurality of cells; determining, for the one or more cells in the plurality of cells, an existence of a CRS for selected subframes of a plurality of subframes based on the MBSFN subframe configuration information; determining for the one or more cells in the plurality of cells, an existence of a PRS for selected subframes of the plurality of subframes based on the PRS configuration information; and measuring the RSTD for the one or more cells in the plurality of cells using the CRS and the PRS.

Example 51 includes the at least one machine readable storage medium of example 50, further comprising instructions when executed by the one or more processors perform the following: decoding the MBSFN subframe configuration information, wherein the MBSFN subframe configuration comprises a selected subset of full information for a MBSFN subframe.

Example 52 includes the at least one machine readable storage medium of example 50 or 51, further comprising instructions when executed by the one or more processors perform the following: decoding the MBSFN subframe configuration information, wherein the MBSFN subframe configuration further comprises CRS non-existence information for one or more subframes of the plurality of subframes.

Example 53 includes the at least one machine readable storage medium of example 50, further comprising instructions when executed by the one or more processors perform the following: determining the existence of the CRS for the selected subframes of the plurality of subframes in each cell in the plurality of cells; or determining the existence of the CRS for the selected subframes of the plurality of subframes in a selected cell in the plurality of cells and apply the existence of the CRS for the remaining cells in the plurality of cells based on the MBSFN subframe configuration information.

Example 54 includes the at least one machine readable storage medium of example 50, wherein the plurality of cells comprises a reference cell and one or more neighbor cells.

Example 55 includes the at least one machine readable storage medium of example 50, further comprising instructions when executed by the one or more processors perform the following: decoding a MBSFN subframe configuration for a cell to enable the UE to determine when the MBSFN subframe configuration for a cell to inform whether or not the MBSFN subframe configuration of the cell is different from a serving cell of the UE.

Example 56 includes a user equipment (UE) operable to perform Reference Signal Time Difference (RSTD) measurements for Observed Time Difference Of Arrival (OTDOA) positioning, the UE comprising: means for decoding a multimedia broadcast multicast service (MBMS) single frequency network (MBSFN) subframe configuration information for one or more cells in a plurality of cells; means for decoding Positioning Reference Signal (PRS) configuration information for one or more cells in the plurality of cells; means for determining, for the one or more cells in the plurality of cells, an existence of a CRS for selected subframes of a plurality of subframes based on the MBSFN subframe configuration information; means for determining for the one or more cells in the plurality of cells, an existence of a PRS for selected subframes of the plurality of subframes based on the PRS configuration information; and measuring the RSTD for the one or more cells in the plurality of cells using the CRS and the PRS.

Example 57 includes the UE of example 56, further comprising: means for decoding the MBSFN subframe configuration information, wherein the MBSFN subframe configuration comprises a selected subset of full information for a MBSFN subframe.

Example 58 includes the UE of example 56 or 57, further comprising: means for decoding the MBSFN subframe configuration information, wherein the MBSFN subframe configuration further comprises CRS non-existence information for one or more subframes of the plurality of subframes.

Example 59 includes the UE of example 56, further comprising: means for determining the existence of the CRS for the selected subframes of the plurality of subframes in each cell in the plurality of cells.

Example 60 includes the UE of example 56, further comprising: means for determining the existence of the CRS for the selected subframes of the plurality of subframes in a selected cell in the plurality of cells and apply the existence of the CRS for the remaining cells in the plurality of cells based on the MBSFN subframe configuration information.

Example 61 includes the UE of example 56, wherein the plurality of cells comprises a reference cell and one or more neighbor cells.

Example 62 includes the UE of example 56, further comprising: means for decoding a MBSFN subframe configuration for a cell to enable the UE to determine when the MBSFN subframe configuration for a cell to inform whether or not the MBSFN subframe configuration of the cell is different from a serving cell of the UE.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) configured to perform Reference Signal Time Difference (RSTD) measurements for Observed Time Difference Of Arrival (OTDOA) positioning, the apparatus comprising:
one or more processors configured to:
decode a multimedia broadcast multicast service (MBMS) single frequency network (MBSFN) subframe configuration information for one or more cells in a plurality of cells;
decode Positioning Reference Signal (PRS) configuration information for one or more cells in the plurality of cells;
determine, for the one or more cells in the plurality of cells, an existence of a Cell Specific Reference Signal (CRS) for selected subframes of a plurality of subframes based on the MBSFN subframe configuration information;
determine for the one or more cells in the plurality of cells, an existence of a PRS for selected subframes of the plurality of subframes based on the PRS configuration information, wherein the one or more processors are configured to determine the existence of the CRS for selected subframes and the existence of the PRS for the selected subframes for cells that are aligned with the MBSFN subframe configuration of a serving cell of the UE;
measure the RSTD for the one or more cells in the plurality of cells using the CRS and the PRS; and
a memory interface configured to send to a memory the RSTD.

2. The apparatus of claim 1, wherein the one or more processors are further configured to decode the MBSFN subframe configuration information, wherein the MBSFN subframe configuration comprises a selected subset of full information for a MBSFN subframe.

3. The apparatus of claim 1, wherein the one or more processors are further configured to decode the MBSFN subframe configuration information, wherein the MBSFN subframe configuration further comprises CRS non-existence information for one or more subframes of the plurality of subframes.

4. The apparatus of claim 1, wherein the plurality of cells comprises a reference cell and one or more neighbor cells.

5. The apparatus of claim 1, wherein the one or more processors are further configured to determine the existence of the CRS for the selected subframes of the plurality of subframes in each cell in the plurality of cells.

6. The apparatus of claim 1, wherein the one or more processors are further configured to determine the existence of the CRS for the selected subframes of the plurality of subframes in a selected cell in the plurality of cells and apply the existence of the CRS for the remaining cells in the plurality of cells based on the MBSFN subframe configuration information.

7. The apparatus of claim 1, wherein the one or more processors are further configured to decode a MBSFN subframe configuration for a cell to enable the UE to determine when the MBSFN subframe configuration for a cell to inform whether or not the MBSFN subframe configuration of the cell is different from the serving cell of the UE.

8. An apparatus of a user equipment (UE) configured to perform Reference Signal Time Difference (RSTD) measurements for Observed Time Difference Of Arrival (OTDOA) positioning, the apparatus comprising:
one or more processors configured to:
decode a multimedia broadcast multicast service (MBMS) single frequency network (MBSFN) subframe configuration information from a system information block two (SIB-2) for a serving cell in a plurality of cells;
decode an MBSFN subframe alignment of each cell in the plurality of cells with a MBSFN configuration of the serving cell, wherein the one or more processors are configured to decode a one bit signal wherein a bit value equal to "one" indicates MBSFN subframes for the plurality of cells are aligned with the MBSFN subframe configuration of the serving cell and a bit value equal to "zero" indicates that the MBSFN subframes for one or more subframes in the plurality of cells are not aligned with the MBSFN subframe configuration of the serving cell;

determine, for one or more cells in the plurality of cells, an existence of a Cell Specific Reference Signal (CRS) for selected subframes of a plurality of subframes based on the MBSFN subframe alignment of each cell in the plurality of cells;

determine, for the one or more cells in the plurality of cells, an existence of a positioning reference signal (PRS) for selected subframes of a plurality of subframes based on the MBSFN subframe alignment of each cell in the plurality of cells; and measure the RSTD for the one or more cells in the plurality of cells using the CRS and the PRS; and a memory interface configured to send to a memory the RSTD.

9. The apparatus of claim 8, wherein the one or more processors are further configured to decode the MBSFN subframe alignment comprising signaling from the network from a network indicating selected cells from the plurality of cells that are aligned with the MBSFN subframe configuration of the serving cell.

10. The apparatus of claim 8, wherein the one or more processors are further configured to decode a one bit signal in an OTDOA-reference cell information (OTDOA-ReferenceCellInfo) and an OTDOA-neighbor cell information (OTDOA-NeighborCellInfo).

11. The apparatus of claim 8, wherein the one or more processors are further configured to determine the existence of the CRS for selected subframes and the existence of the PRS for selected subframes for cells that are aligned with the MBSFN subframe configuration of the serving cell.

12. The apparatus of claim 8, wherein the one or more processors are further configured to:

decode the MBSFN subframe alignment of each cell in the plurality of cells with the MBSFN subframe configuration of the serving cell to identify one or more cells in the plurality of cells that are not aligned with the MBSFN subframe configuration of the serving cell; and determine, for the one or more cells in the plurality of cells that are not aligned, an existence of a CRS for subframes 0, 4, 5, 9 of a radio frame and the existence of the CRS in a first orthogonal frequency division multiplexing (OFDM) symbol in subframes 1, 2, 3, 6, 7, 8 of the radio frame.

13. At least one non-transitory machine readable storage medium having instructions embodied there on for supporting an apparatus of a user equipment (UE) configured to perform Reference Signal Time Difference (RSTD) measurements for Observed Time Difference Of Arrival (OTDOA) positioning, the instructions when executed by one or more processors at the UE perform the following:

decoding a multimedia broadcast multicast service (MBMS) single frequency network (MBSFN) subframe configuration information for one or more cells in a plurality of cells;

decoding Positioning Reference Signal (PRS) configuration information for one or more cells in the plurality of cells;

determining, for the one or more cells in the plurality of cells, an existence of a Cell Specific Reference Signal (CRS) for selected subframes of a plurality of subframes based on the MBSFN subframe configuration information;

determining for the one or more cells in the plurality of cells, an existence of a PRS for selected subframes of the plurality of subframes based on the PRS configuration information, wherein determining the existence of CRS and the existence of PRS comprises determining the existence of the CRS for selected subframes and the existence of the PRS for the selected subframes for cells that are aligned with the MBSFN subframe configuration of a serving cell of the UE; and measuring the RSTD for the one or more cells in the plurality of cells using the CRS and the PRS.

14. The at least one non-transitory machine readable storage medium of claim 13, further comprising instructions when executed by the one or more processors perform the following:

decoding the MBSFN subframe configuration information, wherein the MBSFN subframe configuration comprises a selected subset of full information for a MBSFN subframe.

15. The at least one non-transitory machine readable storage medium of claim 13, further comprising instructions when executed by the one or more processors perform the following:

decoding the MBSFN subframe configuration information, wherein the MBSFN subframe configuration further comprises CRS non-existence information for one or more subframes of the plurality of subframes.

16. The at least one non-transitory machine readable storage medium of claim 13, further comprising instructions when executed by the one or more processors perform the following:

determining the existence of the CRS for the selected subframes of the plurality of subframes in each cell in the plurality of cells.

17. The at least one non-transitory machine readable storage medium of claim 13, further comprising instructions when executed by the one or more processors perform the following:

determining the existence of the CRS for the selected subframes of the plurality of subframes in a selected cell in the plurality of cells and apply the existence of the CRS for the remaining cells in the plurality of cells based on the MBSFN subframe configuration information.

18. The at least one non-transitory machine readable storage medium of claim 13, wherein the plurality of cells comprises a reference cell and one or more neighbor cells.

19. The at least one non-transitory machine readable storage medium of claim 13, further comprising instructions when executed by the one or more processors perform the following:

decoding a MBSFN subframe configuration for a cell to enable the UE to determine when the MBSFN subframe configuration for a cell to inform whether or not the MBSFN subframe configuration of the cell is different from a serving cell of the UE.

* * * * *